US012627631B2

(12) United States Patent
Yao

(10) Patent No.: US 12,627,631 B2
(45) Date of Patent: May 12, 2026

(54) INTER-PARTNER MESSAGING INTEROPERABILTY

(71) Applicant: AT&T Intellectual Property I, L.P., Atlanta, GA (US)

(72) Inventor: Timothy Yao, Cle Elum, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 4 days.

(21) Appl. No.: 18/408,037

(22) Filed: Jan. 9, 2024

(65) Prior Publication Data

US 2024/0388562 A1 Nov. 21, 2024

Related U.S. Application Data

(60) Provisional application No. 63/502,519, filed on May 16, 2023.

(51) Int. Cl.
*H04L 61/4511* (2022.01)
*H04L 67/02* (2022.01)
*H04L 67/06* (2022.01)

(52) U.S. Cl.
CPC .......... *H04L 61/4511* (2022.05); *H04L 67/02* (2013.01); *H04L 67/06* (2013.01)

(58) Field of Classification Search
CPC ............. H04L 65/1104; H04L 65/1069; H04L 63/0236; H04L 65/1016; H04L 61/4511
See application file for complete search history.

(56) References Cited

U.S. PATENT DOCUMENTS

| | | | | |
|---|---|---|---|---|
| 7,260,207 B2 * | 8/2007 | Marsico | .............. | H04M 7/0075 |
| | | | | 370/352 |
| 9,247,478 B1 * | 1/2016 | Gorman | .............. | H04L 61/4511 |
| 10,476,822 B2 * | 11/2019 | Synal | .................... | H04L 51/066 |
| 11,637,874 B2 * | 4/2023 | Asveren | .............. | H04L 61/2589 |
| | | | | 709/228 |
| 2006/0020713 A1 * | 1/2006 | Kobayashi | ............ | H04M 7/006 |
| | | | | 709/245 |
| 2009/0221310 A1 * | 9/2009 | Chen | .................... | H04L 51/066 |
| | | | | 455/466 |

(Continued)

OTHER PUBLICATIONS

GSM Association ; SIP-SDP Inter-IMS NNI Profile Version 8.0 Oct. 16, 2020 (Year: 2020).*

*Primary Examiner* — Chirag R Patel
(74) *Attorney, Agent, or Firm* — Guntin & Gust, PLC; John G. Rauch

(57) ABSTRACT

Aspects of the subject disclosure may include, for example, identifying, at an originating network, a recipient of a message at a terminating network, communicating a query message from the originating network to a domain name service, the query message including a query message service identifier for an inter-partner messaging service, receiving, at the originating network, a response message, the response message including a response message service identifier for the inter-partner messaging service, the response message including addressing information for communicating the message to the terminating network, formatting the message, and transmitting the message from the originating network to the terminating network based on the addressing information. Other embodiments are disclosed.

20 Claims, 8 Drawing Sheets

(56)         References Cited

U.S. PATENT DOCUMENTS

| | | | | |
|---|---|---|---|---|
| 2010/0040048 A1* | 2/2010 | Vormisto | ............ | H04L 61/4557 |
| | | | | 370/352 |
| 2010/0331021 A1* | 12/2010 | Bushnell | ................. | H04L 51/58 |
| | | | | 455/466 |
| 2012/0185604 A1* | 7/2012 | Shatsky | ................ | H04L 67/306 |
| | | | | 709/228 |
| 2017/0244663 A1* | 8/2017 | Ku | ...................... | H04L 61/4557 |
| 2018/0167345 A1* | 6/2018 | Synal | .................... | H04L 67/565 |

* cited by examiner

200

200

300

600

INTER-PARTNER MESSAGING INTEROPERABILTY

CROSS-REFERENCE TO RELATED APPLICATIONS

The present application claims the benefit of priority to U.S. Provisional Application No. 63/502,519 filed on May 16, 2023, which is hereby incorporated herein by reference in its entirety.

FIELD OF THE DISCLOSURE

The subject disclosure relates to messaging among differing messaging service providers using networks such as the public internet.

BACKGROUND

Generally, Mobile Network Operators and Internet companies each have their own versions of messaging services. Such messaging services allows subscribers to communicate messages to other subscribers and other destinations.

BRIEF DESCRIPTION OF THE DRAWINGS

Reference will now be made to the accompanying drawings, which are not necessarily drawn to scale, and wherein.

DETAILED DESCRIPTION

Figure 1:
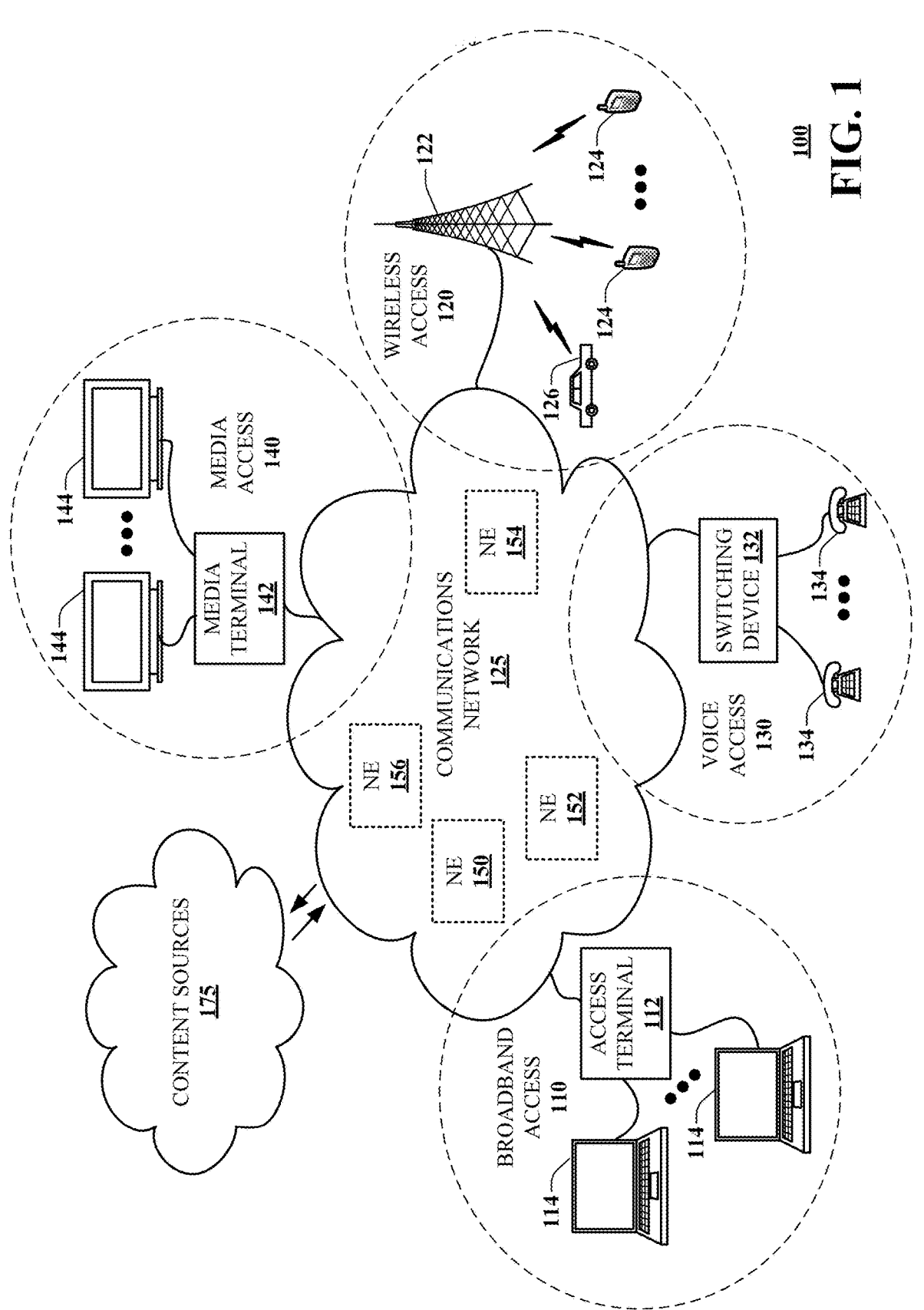
FIG. 1 is a block diagram illustrating an exemplary, non-limiting embodiment of a communications network in accordance with various aspects described herein.

The subject disclosure describes, among other things, illustrative embodiments for enabling message communication, including communication of file attachments, delivery receipts and read receipts, between operators of mobile networks and operators of internet-based messaging and chat systems. A message format is defined which enable confirmation that an intended recipient has an account served by the internet-based messaging service. A further message format is defined which allows the mobile network operator or other originating network to resolve the routing target for the message communication. A further message format is defined which allows for communication of file attachments, delivery receipts and read receipts. Other embodiments are described in the subject disclosure.

One or more aspects of the subject disclosure include identifying, at an originating network, a recipient of a message at a terminating network, communicating a query message from the originating network to a domain name service, the query message including a query message service identifier for an inter-partner messaging service, receiving, at the originating network, a response message, the response message including a response message service identifier for the inter-partner messaging service, the response message including addressing information for communicating the message to the terminating network, formatting the message, and transmitting the message from the originating network to the terminating network based on the addressing information.

One or more aspects of the subject disclosure include receiving a text message from a user at a user device on an originating network, the message including recipient identification information for a recipient on a terminating network, communicating a service initiation protocol (SIP) query message to a domain name service, the SIP query message including a service identifier for an inter-partner messaging service, receiving a SIP response message from the domain name service, the SIP response message including information about a socket and an internet protocol (IP) address of the terminating network to use for the inter-partner messaging service, and transmitting the text message from the originating network to the terminating network at the socket and the IP address of the terminating network received in the SIP response message.

One or more aspects of the subject disclosure include receiving a text message from a user at a user device on an originating network, the text message including content intended for a recipient at a recipient device on a terminating network, confirming the recipient is served by a messaging service of the terminating network, including transmitting a confirming message, the confirming message including a message service identifier for inter-partner messaging by the originating network and the terminating network, and obtaining, for the recipient, a Uniform Resource Identifier (URI) which identifies an account of the recipient on the terminating network, including transmitting a query message from the originating network to the terminating network, the query message including the message service identifier for inter-partner messaging by the originating network and the terminating network. Aspects of the subject disclosure further include formatting a message including the content intended for the recipient at the recipient device on a terminating network, the message further including addressing information based on the URI which identifies the account of the recipient on the terminating network, the message further including the message service identifier for inter-partner messaging by the originating network and the terminating network, and transmitting the message from the originating network to the terminating network.

Referring now to FIG. 1, a block diagram is shown illustrating an example, non-limiting embodiment of a system 100 in accordance with various aspects described herein. For example, system 100 can facilitate in whole or in part enabling communication of user text messages, including communication of file attachments, delivery receipts and read receipts, between operators of mobile networks and operators of internet-based messaging and chat systems. In particular, a communications network 125 is presented for providing broadband access 110 to a plurality of data terminals 114 via access terminal 112, wireless access 120 to a plurality of mobile devices 124 and vehicle 126 via base station or access point 122, voice access 130 to a plurality of telephony devices 134, via switching device 132 and/or media access 140 to a plurality of audio/video display devices 144 via media terminal 142. In addition, communication network 125 is coupled to one or more content sources 175 of audio, video, graphics, text and/or other media. While broadband access 110, wireless access 120, voice access 130 and media access 140 are shown separately, one or more of these forms of access can be combined to provide multiple access services to a single client device (e.g., mobile devices 124 can receive media content via media terminal 142, data terminal 114 can be provided voice access via switching device 132, and so on).

The communications network 125 includes a plurality of network elements (NE) 150, 152, 154, 156, etc. for facilitating the broadband access 110, wireless access 120, voice access 130, media access 140 and/or the distribution of content from content sources 175. The communications network 125 can include a circuit switched or packet switched network, a voice over Internet protocol (VOIP) network, Internet protocol (IP) network, a cable network, a passive or active optical network, a 4G, 5G, or higher generation wireless access network, WIMAX network, UltraWideband network, personal area network or other wireless access network, a broadcast satellite network and/or other communications network.

In various embodiments, the access terminal 112 can include a digital subscriber line access multiplexer (DSLAM), cable modem termination system (CMTS), optical line terminal (OLT) and/or other access terminal. The data terminals 114 can include personal computers, laptop computers, netbook computers, tablets or other computing devices along with digital subscriber line (DSL) modems, data over coax service interface specification (DOCSIS) modems or other cable modems, a wireless modem such as a 4G, 5G, or higher generation modem, an optical modem and/or other access devices.

In various embodiments, the base station or access point 122 can include a 4G, 5G, or higher generation base station, an access point that operates via an 802.11 standard such as 802.11n, 802.11ac or other wireless access terminal. The mobile devices 124 can include mobile phones, e-readers, tablets, phablets, wireless modems, and/or other mobile computing devices.

In various embodiments, the switching device 132 can include a private branch exchange or central office switch, a media services gateway, VOIP gateway or other gateway device and/or other switching device. The telephony devices 134 can include traditional telephones (with or without a terminal adapter), VOIP telephones and/or other telephony devices.

In various embodiments, the media terminal 142 can include a cable head-end or other TV head-end, a satellite receiver, gateway or other media terminal 142. The display devices 144 can include televisions with or without a set top box, personal computers and/or other display devices.

In various embodiments, the content sources 175 include broadcast television and radio sources, video on demand platforms and streaming video and audio services platforms, one or more content data networks, data servers, web servers and other content servers, and/or other sources of media.

In various embodiments, the communications network 125 can include wired, optical and/or wireless links and the network elements 150, 152, 154, 156, etc. can include service switching points, signal transfer points, service control points, network gateways, media distribution hubs, servers, firewalls, routers, edge devices, switches and other network nodes for routing and controlling communications traffic over wired, optical and wireless links as part of the Internet and other public networks as well as one or more private networks, for managing subscriber access, for billing and network management and for supporting other network functions.

Figure 2A:
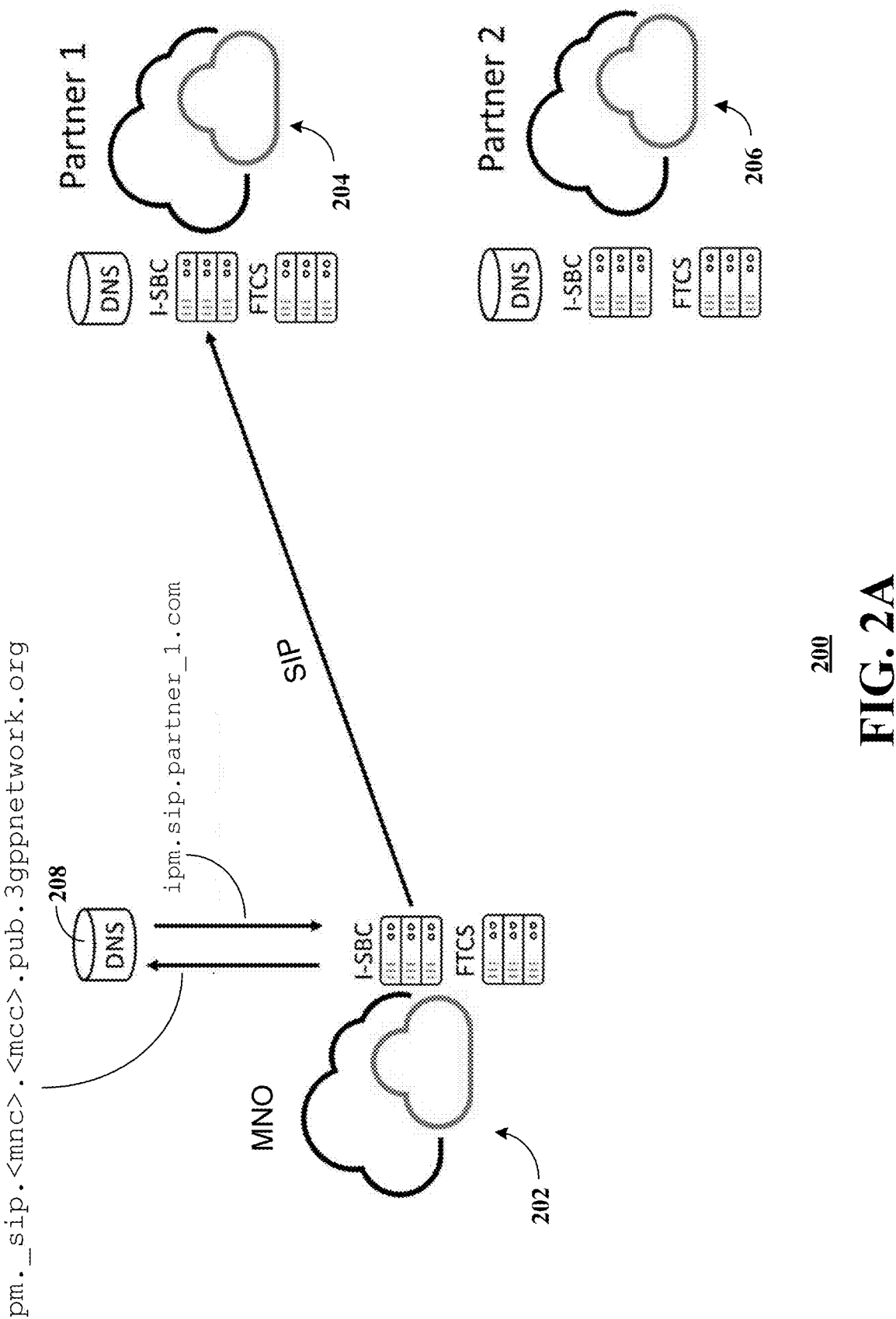
FIG. 2A is a block diagram illustrating an example, non-limiting embodiment of a system for inter-partner messaging, functioning within the communication network of FIG. 1, in accordance with various aspects described herein.

FIG. 2A is a block diagram illustrating an example, non-limiting embodiment of a system 200 for inter-partner messaging, functioning within the communication network of FIG. 1, in accordance with various aspects described herein. The system 200 may be used to implement an inter-partner messaging system in accordance with various aspects described herein.

Generally, Mobile Network Operators and Internet companies each have their own versions of messaging services. Mobility Network Operators (MNOs) include network providers such as AT&T which operate independent networks providing mobile voice and data services to customers. Such messaging services provided by the operating system, such as Android or iOS, or a network element within a MNO's network. Some Internet companies also provide messaging services, which may be referred to as internet-based messaging services. Other services are available from other providers as well. Such messaging services allows subscribers to communicate messages to other subscribers and other destinations. Such messages may include attachments such as data files.

A subset of such messaging services in the world is governed by standards bodies like the GSM Association (GSMA). An example of such a service is the Rich Communication Service (RCS). RCS is a communication protocol controlling communications between mobile telephone carriers and between mobile devices and a carrier. Other messaging services include standalone developments, such as the Internet services noted above. Each these messaging services operate independently, in their own ecosystem, according to their own protocols and signaling. If a first user communicates with a second user via a common service, a variety of features are available, such as message attachments, delivery receipts, read receipts, etc. Subscribers or users from each of these messaging services generally cannot communicate across different messaging services. Subscribers generally can only communicate with subscribers or users from a common ecosystem. In the case of devices operated on a mobility network, such as an RCS device for the Android operating system and a device on the iOS operating system, such devices can communicate, but the communication is limited to text only with no or few additional features. The communication downgrades to a legacy short messaging service (SMS). A device on a mobility network cannot communicate using RCS or iMessage with an internet messaging service. For example, users of one internet-based messaging service generally cannot communicate directly with users of an MNO-based messaging service or another internet-based messaging service.

A system for inter-partner messaging in accordance with various aspects described herein enables a wide variety of messaging services to interoperate. With inter partner messaging, a subscriber being served by a mobile network operator can readily communicate with the Internet-based messaging services This includes messaging services offered by MNOs as well as messaging services offered by Internet-based messaging service companies. This solution allows all subscribers and users of disparate messaging services to communicate with each other.

With interoperability, a service must have a uniform means to provide user identification. In addition, the originating network must have a means to identify the endpoint of the terminating network, either the receiving user or the receiving device on the terminating network. Lastly, both the originating network and the terminating network must possess a means to discern a service type for service-deterministic routing.

Inter-partner messaging describes communicating messages between an originating user operating a device on an originating network, and a receiving user operating a device on a receiving network. In accordance with various aspects described herein, a solution that provides inter-partner messaging has three aspects. A first aspect is user identification. A second aspect is routing target resolution. A third aspect is internal internet protocol (IP) multimedia subsystem (IMS) core routing. IMS is a standardized architectural framework for delivery IP multimedia services to subscribers such as MNO subscribers. IMS is standardized by, for example, the 3$^{rd}$ Generation Partnership Project (3GPP). IMS uses protocols such as session initiation protocol (SIP) and operates to facilitate access of multimedia and voice applications from wireless and wireline terminals. A core network of an MNO or messaging service provider enables access to such applications and other features.

The user identification aspect relates to determining, at the originating device or the originating network, identification information for the receiving user or receiving device at the terminating network. This may include, for example, how the terminating user or the terminating device is uniquely identified, as well as what network, application or service provider provides messaging service to the receiving user or the receiving device. Generally, each messaging service provider maintains a database or other information including account information and user identification information for its subscribers. Subscriber identification information is available via database lookup in the user database of the terminating network.

For example, the receiving user may be uniquely identified by a uniform resource identifier (URI) such as an email address or a telephone number. A URI is a unique sequence of characters that identifies a logical or physical resource or user. An email address is an example of an alphanumeric URI, such as sip:joe.smith@example.com. SIP or session initiation protocol is used by IP-based services that involve the IMS core of a provider network. SIP allows endpoints on the Internet to discover one another and to exchange context information. A telephone number is an example of an E.164 URI. E.164 is an ITU-T standard that defines a numbering plan for worldwide public switched telephone networks. E.164 defines a general format for telephone numbers. Conforming telephone numbers generally consist of a country code prepended with a plus sign (+) and a subscriber number. Examples include sip:+15556667777@example.com; user=phone and tel:+15556667777. The receiving user may be termed the mobile terminator (MT) or the called party. The identifier associated with any given user or user device may depend on the service provider. For example, an internet-based company most likely will use an alphanumeric URI because an internet-based provider does not have access to telephone number to provide to subscribers. On the other hand, an MNO will most likely use an E.164 URI to identify subscribers.

To enable user identification, an originating network may employ an inter-provider E.164 number to URI mapping (ENUM). ENUM is a system that uses a domain name service (DNS) to translate a telephone number into an E.164 URI. ENUM operates to facilitate the interconnection of systems that rely on telephone numbers, such as a mobility network, with systems that use alphanumeric URIs to route transactions. As indicated, each messaging service provider maintains a user database providing user identification information. In accordance with aspects described herein, each mobile network operator and each internet messaging provider share their respective user databases with each other to enable inter-provider messaging. Each provider owns or has its own subscriber base including identification information and URI information for each subscriber. In order to gain visibility to such proprietary information, there may be in place a mutual agreement to bilateral exchange of such information.

A Name Authority Pointer (NAPTR) is a resource record in a DNS. NAPTR records may be used for applications in internet telephony, such as for mapping servers and user addresses in SIP. The combination of NAPTR records with Service Records (SRV) allows the chaining of multiple records to form new URIs, for example. Each NAPTR record generally contains a service name, a set of flags, a regular expression rule, an order value, and preference and a replacement pattern. NAPTR records permit an originating client or device to select a particular URI for communications.

The ENUMservice field appears in NAPTR records for a particular E.164 number. Contents of the ENUMservice field describe the services supported by that number. The service name field of the NPPTR record contains a string that is composed of two subfields. The first subfield is a protocol subfield. The second subfield is a resolution service subfield. ENUM defines an E2U (E.164 to URI) resolution service. In examples, E2U+sip is used for Telephony. E2U+rcs was standardized by GSMA for RCS.

To enable suitable user identification, inter-partner messaging may require definition of a new service type, similar to E2U+sip and E2U+rcs. In accordance with some aspects described herein, a new service type for inter-provider messaging is defined that may be termed E2U+ipm. Table 1 shows an example NAPTR record with information associated with the service type E2U+ipm. The NAPTR record of Table 1 is generated in an ENUM response in response to a query for, for example, joe.smith@example.com.

TABLE 1

| |
| --- |
| 7.7.7.7.6.6.6.5.5.5.1.e164enum.net: type NAPTR, class IN, order 100, preference 20, flags u |
|    Name: 7.7.7.7.6.6.6.5.5.5.1.e164enum.net |
|    Type: NAPTR (Naming Authority Pointer) (35) |
|    Class: IN (0x0001) |
|    Time to live: 0 (0 seconds) |
|    Data length: 65 |
|    Order: 100 |
|    Preference: 20 |
|    Flags Length: 1 |
|    Flags: u |
|    Service Length: 7 |
|    Service: E2U+ipm |
|    Regex Length: 49 |
|    Regex: !^.*$!sip:+15556667777@example.com;user=phone! |
|    [Replacement Length: 6] |
|    Replacement: <Root> |

An originating network may define a NAPTR record to request a URI for a terminating user having an account with the terminating network. If there is a positive hit when the database is searched, meaning the requested account or record exists at the terminating network, the terminating network will return a regular expression (regex) that contains the desired URI, including either the desired user's phone number such as +15556667777 or the desired user's username at the terminating network, such as joe.smith@example.com. A regex is a sequence of characters that specifies a match pattern in text.

It may occur that a subscriber does not have an account with a particular messaging service provider, corresponding to a negative hit on the database search. For example, an originating user at the originating network may designate an addressee or intended recipient as joe.smith@example.com. However, the terminating network, example.com, may not have an account or record associated with such a user. The response from the terminating network will be empty or blank, indicating that there is no such account or associated record found.

Thus, the originating network may use a NAPTR record having a service type E2U+ipm to request a URI for a terminating user having an account with the terminating network. This resolves the first aspect of the solution that provides inter-partner messaging. A second aspect is routing target resolution. The originating network next needs to determine how to route session initiation protocol (SIP) traffic to the terminating network. SIP is used most IP-based services used to establish a session. In an example, the originating network is an MNO that determines the terminating network is example.com. The originating network, the MNO, tries to establish a session based on receipt of the ENUM response (Table 1) identifying the URI of the terminating user.

SIP is used for establishing sessions to deliver texts, delivery receipts, read receipts, and indicating, for example, that the terminating user is typing notifications. The originating network uses a standardized string to determine to which IP address of the terminating network to route the SIP traffic. This is also used to determine which port to use for the SIP traffic. A service DNS record is used to obtain the required information from a domain name service. The domain name service (DNS) translates domain alphanumeric names such as example.com to numerical IP addresses needed for locating and identifying computer services with underlying network protocols.

SIP Implementation

For inter-partner messaging, a new service record (SRV) query prefix is needed for SIP, so that the originating network knows what port and what IP address to use for establishing sockets, for SIP sessions. The SRV must specify the service and the layer 4 protocol to be used. In accordance with some aspects described herein, an example SRV record format for a DNS query is illustrated as Table 2.

TABLE 2

| |
| --- |
| _ipm._sip.<mnc>.<mcc>.pub.3gppnetwork.org. |

In this example, the prefix ipm specifies the inter-partner messaging service. The rest of the string represents the authoritative DNS that is responsible for resolving the DNS query.

The DNS responds to the SRV query with information defining the IP address and port identifier for the terminating network. A generic format response and an example response are shown in Table 3.

TABLE 3

| |
| --- |
| Structure |
| _service._proto.name. TTL class type of record priority weight port target |
| Example |
| _ipm._sip.<mnc>.<mcc>.pub.3gppnetwork.org. 600 IN SRV 10 0 8060 ipm.sip.<subdomain>.example.com. |

The service name or ._service is ipm for inter-party messaging. TTL is a time to live or 600 seconds in this example. The field class of the record is set to IN for Internet. The record type in this example is SRV indicating a service locator record. In this example, the priority is 10, the weight is 0. and the port number is 8060.

The response in Table 3 indicates that the port number in this example is 8060. The address to which SIP traffic should be routed, in this example, is ipm.sip.<subdomain>.example.com. The field mcc indicates a mobile country code. The field mnc indicates a mobile network code. A mobile country code is assigned by, for example the International Telecommunications Union and used in combination with a mobile network code to uniquely identify a mobile network operator or carrier. The mobile country code and the mobile network code are conventionally assigned to respective mobile networks. The mobile country code and the mobile network code illustrated in the example response message of Table 3 identify the terminating network. To participate in inter-partner messaging in accordance with these examples, an internet-based messaging service obtains an assigned mobile network code and mobile country code. Identifying additional elements of the response in Table 3, the field pub.3gppnetwork.org identifies the authoritative DNS responsible for the DNS request that generated the response.

Further, the response of Table 3 indicates that the domain name should resolve to ipm.sip.<subdomain>.example.com. The ipm prefix indicates that the domain name corresponds to the inter-partner messaging service. In examples, the top-level domain names, illustrated as example.com, may be any suitable domain name used by internet-based messaging service provider. The server or other equipment of the originating network can use the information of Table 3 to route inter-party messages to the terminating network.

The terminating network may define a time to live (TTL) which limits the lifespan or lifetime of the DNS responses provided by the domain name service. In the example of Table 3, the suggested TTL is 600 seconds. If no TTL is specified, the originating network may continue to use the IP address and port number provided in the response of Table 3. On the other hand, if the TTL has been exceeded, the originating network must again submit a query to the DNS server for the address for the IPM service. For example, a shorter TTL will correspond to a more aggressive strategy for querying by the originating network. A shorter time to live requires more queries to identify the IP address and port number for the inter-party messages, and more queries corresponds to increased network traffic, which may be undesirable.

The successful SRV query returns a port number and a hostname to use for accessing the terminating network. After a successful SRV response is received, per domain name system standards, the originating network will then resolve the hostnames found in the SRV response, with the goal to obtain an IP address to which the originating host sends SIP requests. The SIP requests are responsible for establishing a SIP session to exchange payloads for text messaging.

The originating network will thus submit a DNS A or DNS AAAA request to the DNS. DNS A or AAAA records match a domain name to an IPv4 or IPv6 address. The DNS A or AAAA query may have the following format:

_ipm._sip.<subdomain>.example.com.

The DNS server returns a response with the required IP address information, such as the following example:

```
;; QUESTION SECTION:
; ipm.sip.<subdomain>.example.com. IN A
;; ANSWER SECTION:
ipm.sip.<subdomain>.example.com. 30 IN A 127.0.0.1
```

In this example, the proper IP address to access the inter-partner messaging service for the terminating network is 127.0.0.1.

HTTP Implementation

In some embodiments, HTTP is used for fetching files from the Originating network. For the query to fetch files, a new service record SRV query prefix is needed for HTTP. The new query allows the terminating network to learn what port and what IP to use for establishing sockets for HTTP File Transfer localization.

RCS includes HTTP File Transfer as a service. Files may be attached to or associated with a message for communication from a sender at the originating network to a recipient at the terminating network. The originating mobile network operator uploads a file to the originating network File Transfer Content Server (FTCS). The mobile network operator RCS Application Server (RCS AS) then sends the link of the uploaded file to the MT (Mobile Terminated), as a text message in the form of a URL. The MT Network's RCS AS intercepts the text message and informs MT Network's FTCS. The MT Network's FTCS then localizes the file from MT Network's FTCS. This localization process uses HTTP protocol to obtain the file. Once the file is localized at the MT Network's FTCS, MT Network's FTCS the sends a localized HTTP URL to the MT handset. MT handset then uses this localized HTTP URL to download the localized file from the MT Network's FTCS.

In an example embodiment, the DNS SRV query for HTTP issued by the originating network may have the format of Table 4.

TABLE 4

_ipm._http.<mnc>.<mcc>.pub.3gppnetwork.org.

In the example, the prefix ipm indicates that the inter-party messaging service is being used and the protocol name is http. Mobile network code and mobile country code are also specified, along with the authoritative domain name server, pub.3gppnetwork.org in this example.

In an example embodiment, the DNS SRV response received by the originating network may have the format of Table 5.

TABLE 5

_ipm._http.<mnc>.<mcc>.pub.3gppnetwork.org. 600 IN SRV 10 0
8060 ipm.http.<subdomain>.example.com.

In the example, the prefix ipm indicates that the inter-party messaging service is being used. The protocol name is http. Other fields are similar to those described for the SIP implementation.

After a success SRV response is received at the originating network, per DNS standards, the originating will then resolve the hostnames found in the SRV response, with the goal to obtain an IP to which the originating host sends the HTTP GET request. The DNS A/AAAA query may have the following format:

ipm.http.<subdomain>.example.com.

Similarly, the DNS SRV response may have the following format:

```
;; QUESTION SECTION:
; ipm.http.<subdomain>.example.com. IN A
;; ANSWER SECTION:
ipm.http.<subdomain>.example.com. 30 IN A 127.0.0.2
```

With the information thus far obtained, the originating network resolves the first aspect (user identification) and the second aspect (routing target resolution) of the solution that provides inter-partner messaging. Based on this information, the originating network is able to determine how to route session initiation protocol (SIP) traffic to the terminating network.

The third aspect is internal internet protocol (IP) multimedia subsystem (IMS) core routing. In the originating network, all network elements, including those in the core network, must be configured to read and understand multiple DNS NAPTR records. For example, mobile network operators and Internet-based messaging companies need their respective ENUM/Database-consuming network elements to understand multiple NAPTR records. The core network or IMS core is a portion of an overall communication network that includes devices providing services to subscribers. For an MNO, the core network is in data communication with one or more radio access networks (RANs) that provide radio communication to subscribers' mobile devices. For example, the core network includes functions such as mobility management and a packet data gateway providing access to the public switched internet. Internet-based messaging providers include similar functionality in a core network or elsewhere in the provider's network. Each device must recognize a variety of NAPTR records including the ipm record illustrated in Table 1. This enables the IMS core components to route traffic based on traffic-type. Each traffic type could contain different domains, including E2U+sip, E2U+rcs and E2U+ipm.

In this manner, the originating network can make its own routing decision for a message. For example, the originating network may want to route a message internally, within the network. If the message is an RCS message with traffic type E2U+rcs, the network knows the endpoint is always and RCS endpoint. If the message is an inter-partner message with traffic type E2U+rcs, the network knows that the message will have to be sent external to the network to some other terminating network partner. This enables service discernment at the originating network.

In the telecommunications industry, including providers of voice communication services and providers of RCS messaging services, there exist standardized NAPTR records such as E2U+sip and E2U+rcs. These NAPTR records contain information that guides a mobile originating network to identify a user. A new NAPTR record is needed to provide information representing a positive match or negative match on whether a user is served by a particular messaging service provider. Examples of such messaging service providers include MNOs such as AT&T and as well as internet-based messaging providers.

In addition, upon a successful user identification process, the mobile originating network needs a means to obtain the IP address of the terminating network's host that is dedicated to handling inter-partner messaging traffic. These devices include a Session Boarder Controller that handles SIP traffic and the HTTP File Transfer Content Service. The _.ipm._http prefix and _ipm_.sip prefix as described herein guide the originating network to steer its originating SIP and HTTP traffic toward IP addresses that the terminating network specified via DNS.

Further, the originating network needs a means to discern service type. Upon service type discernment, this proposed solution affords the originating network flexibility to route certain service types as internal traffic and route certain service type as external traffic. Inter-partner messaging traffic, by nature, is external traffic.

Accordingly, inter-partner messaging includes three noted aspects. Inter-partner messaging enables communication of messages, including file attachments, delivery receipts, read receipts and notifications that a user is presently typing, between an originating network and a terminating network. First, the originating network confirms that the receiving user is served by the terminating network. The terminating network provides a response to the originating network including user identification corresponding to the intended recipient of a message.

Second, the originating network determines an appropriate IP address or domain name to route the message to the terminating network. This information includes determining the correct service prefix, e.g., ipm, and the correct protocol prefix such as SIP or HTTP. This operates to standardize communication with appropriate prefixes so that a domain name service returns the respective domain name and IP address through which the terminating network desires to receive the message. The terminating network thus has the ability and responsibility to define network access points for messaging. If the terminating network is an internet-based messaging provider, the terminating network may obtain a mobile network code and a mobile country code from a suitable authority such as 3GPP. Further, the terminating network creates a SRV record to be made public. When the SRV record is queried by the originating network, the response will return the respective domain name and IP address through which the terminating network desires to receive the message, such as ipm.subdomain.example.com for example. In this manner, the terminating network dictate what IP will be produced by the DNS resolution, so the originating network know which terminating IP address to send a message to.

Third, within the terminating network, the terminating can route messages as desired. Internal message handling is at the discretion of the terminating network.

A solution in accordance with aspects described herein enables all Internet-based messaging companies and mobile network operators who have adopted RCS will afford their respective users the ability to send text, pictures, and files beyond the network's own ecosystem. Users from an internet-based messaging provider can send messages to MNO subscribers with full functionality, not limited functionality provided by conventional SMS messaging. Further, global mobile network operators and Internet-based messaging companies who have a messaging portfolio will want their users to communicate with users from a different service. The structure and function described herein enable such benefits.

Referring again to FIG. 2A, the figure illustrates operation of an example, non-limiting embodiment of system 200 for inter-partner messaging. The system 200 in this example includes a mobile network operator (MNO) 202, a first partner 204, and a second partner 206. The first partner 204 and the second partner 206 may be MNOs as well or may be internet-based messaging service providers. The first partner 204 and the second partner 206 and the MNO 202 together participate in an inter-partner messaging service. The inter-partner messaging service provides interoperability for the participant organization. With interoperability, the service provides a uniform means to provide user identification so that a message initiated in a first, originating network can be properly directed to a recipient in a second, terminating network. In addition, the service provides to the originating network a means to identify the endpoint of the terminating network. Lastly, the service provides both the originating network and the terminating network means to discern service type for service-deterministic routing.

In the example, the MNO 202, the first partner 204 and the second partner 206 include similar devices for network communication. Each of the MNO 202, the first partner 204 and the second partner 206 includes an interrupt session border controller (I-SBC) and a file transfer content server (FTCS)

FIG. 2A illustrates operation of the MNO 202, designated as the originating network in this example, to resolve a routing target to initiate a message to a recipient at first partner 204, designated at the terminating network. The NMO 202 uses session initiation protocol (SIP) when communicating with the first partner 204.

In the example of FIG. 2A, SIP is used to establish sessions to deliver to the sender at the originating network texts, delivery receipts, read receipts and "isTyping" notifications, or a notification that the recipient is currently entering information on the recipient's device. The isTyping notification may be presented on the device of the sending as a shimmering cloud or thought bubble, for example. Initially, the sending identifies a recipient and a message. For the originating network to learn what port and what IP address to use for establishing sockets, for SIP sessions, the originating network MNO 202 initiates a new SRV query to the DNS server 208. The query in the illustrated example has the format,

---

_ipm._sip.<mnc>.<mcc>.pub.3gppnetwork.org.

---

Other query formats may be used. Here, the prefix ipm indicates that the desired service is inter-partner messaging. The field sip specifies that session initiation protocol is to be used.

In response to the query, the DNS server 208 returns a message identifying the hostname and port to be used for inter-partner messaging with first partner 204. The response message may have the following format:

---

_ipm._sip.<mnc>.<mcc>.pub.3gppnetwork.org. 600 IN SRV
10 0 8060 ipm.sip.<subdomain>.partner_1.com.

---

Here, the port number 8060 is indicated and the hostname, subdomain.partner1.com is identified. Other necessary information, in accordance with network communication standards, is provided as well. The originating network, MNO 202, may further resolve the hostname partner_1.com, with a DNS lookup to obtain the IP address corresponding to the first partner 204. Based on the information returned by the DNS server 208, the MNO 202 can establish an inter-partner messaging session using SIP with the first partner 204.

Figure 2B:
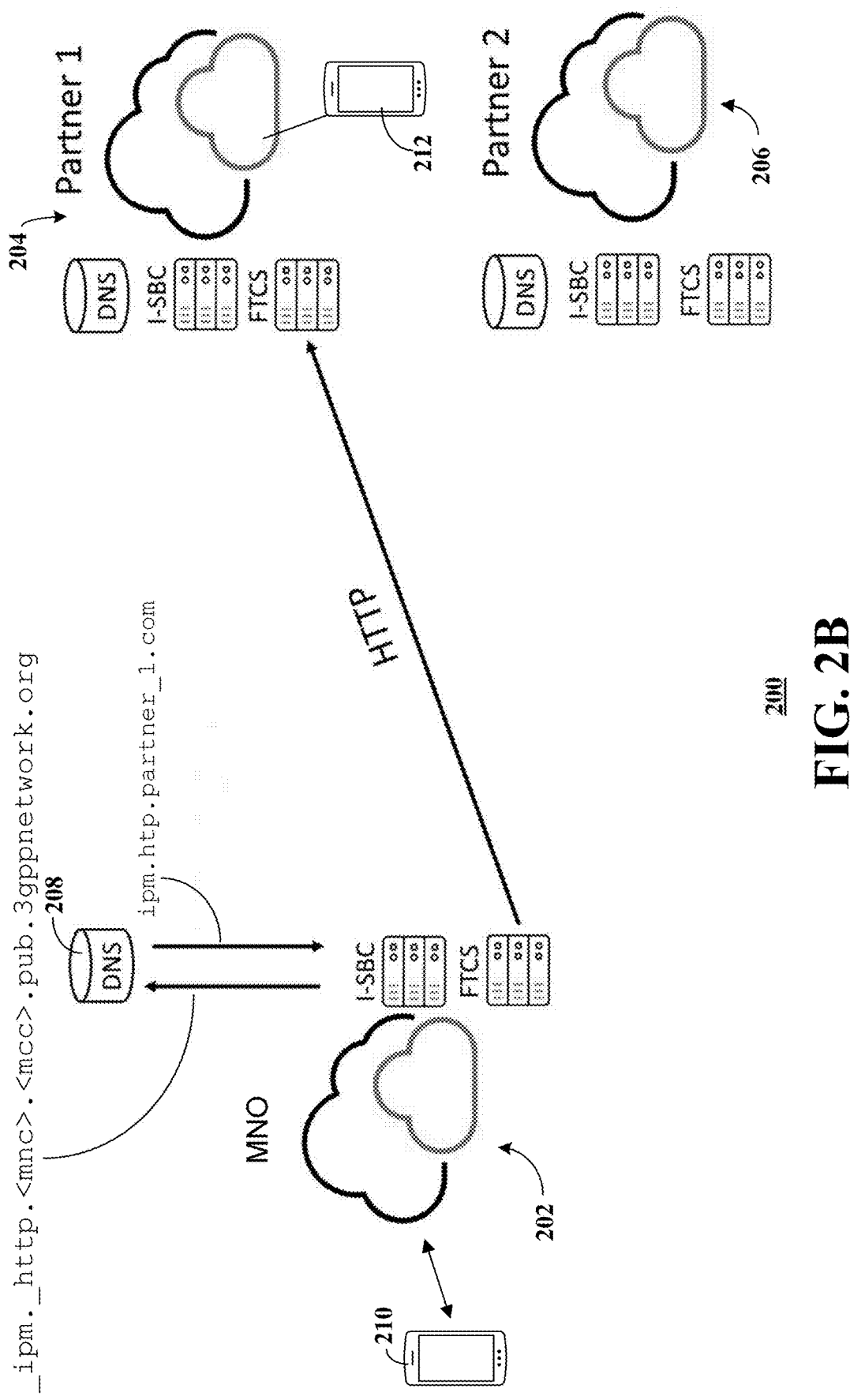
FIG. 2B is a block diagram illustrating an example, non-limiting embodiment of a system for inter-partner messaging with file transfer, functioning within the communication network of FIG. 1, in accordance with various aspects described herein.

FIG. 2B is a block diagram illustrating operation of an example, non-limiting embodiment of a system for inter-partner messaging with file transfer, functioning within the communication network of FIG. 1, in accordance with various aspects described herein. In particular, FIG. 2B provides an example of how HTTP is used to fetch files at a terminating network such as first partner 204, from an originating network such as MNO 202. Additional aspects of a suitable file transfer process and apparatus may be described in further detail in U.S. patent application Ser. No. 16/953,388 filed Nov. 20, 2020, issued as U.S. Pat. No. 11,658,969 on May 23, 2023 and entitled Apparatuses And Methods For Facilitating Port Discernment Driven Mutual Authentication And Service Access Authorization, the entire contents of which are incorporated herein by reference.

In the example of FIG. 2B, each network including the MNO 202, the first partner 204 and the second partner 206, includes a file transfer content server (FTCS) and an interrupt session border controller (I-SBC). The I-SBC operates to control signaling, and optionally media streams for SIP connections. The I-SBC terminates internal signaling at the respective network and handles internet-level signaling between networks including protocol translation and header manipulation.

In the example of FIG. 2B, the user of a mobile device 210 operating on the MNO 202 uploads a file of interest to the MNO 202. For example, the user of the mobile device 210 may format a text message for communication to a user of a second mobile device 212. The second mobile device 212 does not operate on the MNO 202 and may be other than a mobile device, such as a laptop computer, a desktop computer, a tablet computer or other device. The second mobile device 212 accesses the network of the first partner 204 for a messaging service provided by the first partner 204.

In addition to formatting the text message, the user of the mobile device may specify a file attachment to be communicated with the text message. The file attachment can have any file size and may include multiple file attachments. Further, the user of the mobile device 210 may request to receive a delivery receipt when the text message is delivered to the second mobile device 212. Still further the user of the mobile device 210 may request to receive a read receipt when the recipient at the second mobile device 212 views the text message or an attachment to the text message.

The mobile device 210 uploads the file to the FTCS of the originating network, MNO 202. In embodiments, the MNO 202 makes use of the features of Rich Communication Services (RCS) messaging. The MNO 202 includes an RCS Application Server (RCS AS) for RCS messaging. The RCS AS sends a link corresponding to the uploaded file from the user of the mobile device 210 to the terminating network, first partner 204. In embodiments, the link is sent as a text message in the form of an URL.

In embodiments, terminating network includes an RCS AS as well for providing features of RCS messaging. The RCS AS of the terminating network, first partner 204, intercepts the text message and informs the FTCS of the terminating network, first partner 204.

The FTCS of the terminating network then localizes the file from the FTCS of the originating network. This localization process uses HTTP protocol to obtain the file. HTTP messaging between the MNO 202 and the first partner for the file transfer process includes a service name of ipm for inter-party messaging.

Once the file is localized at FTCS of the terminating network, the FTCS of the terminating network, first partner 204, the sends a localized HTTP URL to the second mobile device 212. The second mobile device 212 then uses this localized HTTP URL to download the localized file from FTCS of the first partner 204. Any number of file attachments, and any size of file attachments, may be transferred in this manner using the inter-partner messaging service.

Figure 2C:
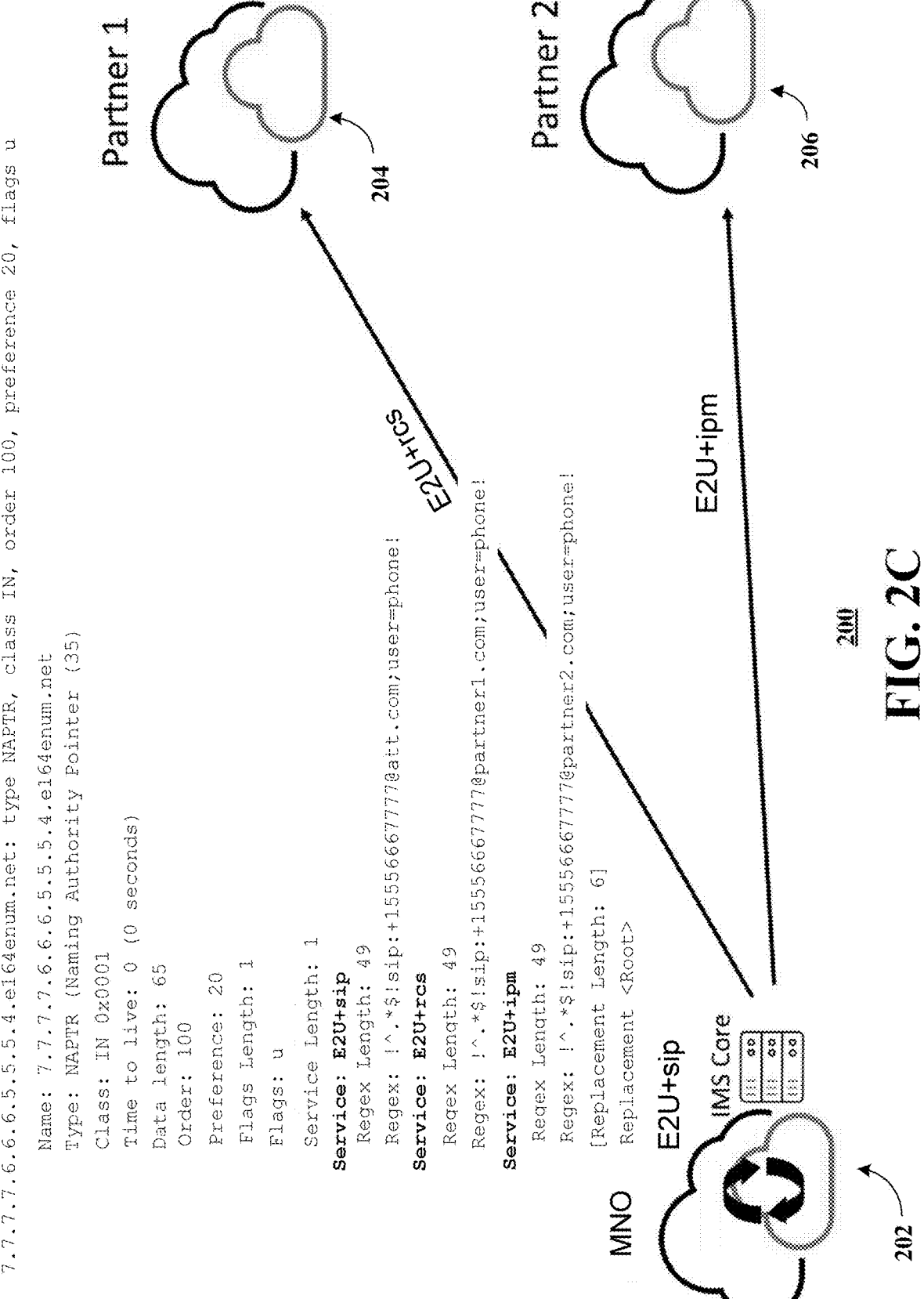
FIG. 2C is a block diagram illustrating an example, non-limiting embodiment of a system for inter-partner messaging, functioning within the communication network of FIG. 1, in accordance with various aspects described herein.

FIG. 2C is a block diagram illustrating an example, non-limiting embodiment of a system for inter-partner messaging, functioning within the communication network of FIG. 1, in accordance with various aspects described herein. FIG. 2C illustrates Internet protocol (IP) multimedia subsystem (IMS) core routing of messages according to the inter-partner messaging. IMS is a standardized architectural framework for delivery IP multimedia services to subscribers such as MNO subscribers. IMS is standardized by, for example, the $3^{rd}$ Generation Partnership Project (3GPP). IMS uses protocols such as session initiation protocol (SIP) and operates to facilitate access of multimedia and voice applications from wireless and wireline terminals. A core network of an MNO such as MNO 202 or messaging service provider such as first partner 204 and second partner 206 enables access to such applications and other features.

To implement inter-partner messaging, mobile network operators such as MNO 202 and Internet-based messaging providers such as first partner 204 and second partner 206 enable their respective ENUM/database-consuming network elements to understand multiple NAPTR records, including the NAPTR record for the inter-partner messaging service. This enables the IMS core of, for example MNO 202, to route traffic based on traffic-type. Each traffic type could contain different domains.

FIG. 2C illustrates exemplary NAPTR record information for service types E2U+sip, E2U+rcs and E2U+ipm. Other service types may be specified and employed as well. In the exemplary embodiment of FIG. 2C, the MNO 202 communicates with first partner 204 using E2U+rcs service type and communicates with the second partner 206 using the E2U+ipm service type.

While for purposes of simplicity of explanation, the respective processes are shown and described as a series of blocks in FIG. 2A, FIG. 2B and FIG. 2C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 3:
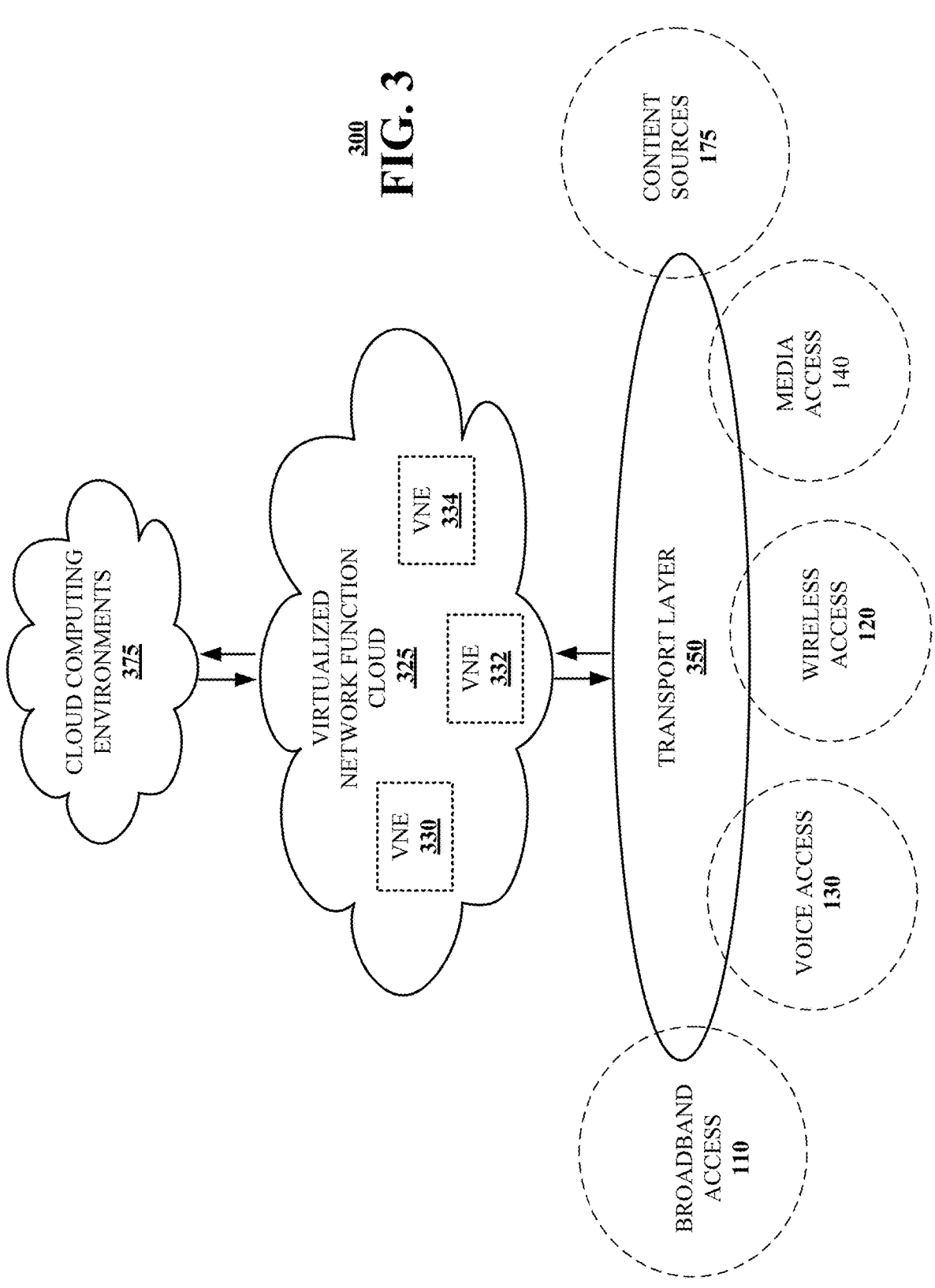
FIG. 3 is a block diagram illustrating an example, non-limiting embodiment of a virtualized communication network in accordance with various aspects described herein.

Referring now to FIG. 3, a block diagram is shown illustrating an example, non-limiting embodiment of a virtualized communication network 300 in accordance with various aspects described herein. In particular a virtualized communication network is presented that can be used to implement some or all of the subsystems and functions of system 100, the subsystems and functions of system 200 presented in FIGS. 1, 2A, 2B, 2C, and 3. For example, virtualized communication network 300 can facilitate in whole or in part enabling communication of user text messages, including communication of file attachments, delivery receipts and read receipts, between operators of mobile networks and operators of internet-based messaging and chat systems.

In particular, a cloud networking architecture is shown that leverages cloud technologies and supports rapid innovation and scalability via a transport layer 350, a virtualized network function cloud 325 and/or one or more cloud computing environments 375. In various embodiments, this cloud networking architecture is an open architecture that leverages application programming interfaces (APIs); reduces complexity from services and operations; supports more nimble business models; and rapidly and seamlessly scales to meet evolving customer requirements including traffic growth, diversity of traffic types, and diversity of performance and reliability expectations.

In contrast to traditional network elements-which are typically integrated to perform a single function, the virtualized communication network employs virtual network elements (VNEs) 330, 332, 334, etc. that perform some or all of the functions of network elements 150, 152, 154, 156, etc. For example, the network architecture can provide a substrate of networking capability, often called Network Function Virtualization Infrastructure (NFVI) or simply infrastructure that is capable of being directed with software and Software Defined Networking (SDN) protocols to perform a broad variety of network functions and services. This infrastructure can include several types of substrates. The most typical type of substrate being servers that support Network Function Virtualization (NFV), followed by packet forwarding capabilities based on generic computing resources, with specialized network technologies brought to bear when general-purpose processors or general-purpose integrated circuit devices offered by merchants (referred to herein as merchant silicon) are not appropriate. In this case, communication services can be implemented as cloud-centric workloads.

As an example, a traditional network element 150 (shown in FIG. 1), such as an edge router can be implemented via a VNE 330 composed of NFV software modules, merchant silicon, and associated controllers. The software can be written so that increasing workload consumes incremental resources from a common resource pool, and moreover so that it is elastic: so, the resources are only consumed when needed. In a similar fashion, other network elements such as other routers, switches, edge caches, and middle boxes are instantiated from the common resource pool. Such sharing of infrastructure across a broad set of uses makes planning and growing infrastructure easier to manage.

In an embodiment, the transport layer 350 includes fiber, cable, wired and/or wireless transport elements, network elements and interfaces to provide broadband access 110, wireless access 120, voice access 130, media access 140 and/or access to content sources 175 for distribution of content to any or all of the access technologies. In particular, in some cases a network element needs to be positioned at a specific place, and this allows for less sharing of common infrastructure. Other times, the network elements have specific physical layer adapters that cannot be abstracted or virtualized and might require special DSP code and analog front ends (AFEs) that do not lend themselves to implementation as VNEs 330, 332 or 334. These network elements can be included in transport layer 350.

The virtualized network function cloud 325 interfaces with the transport layer 350 to provide the VNEs 330, 332, 334, etc. to provide specific NFVs. In particular, the virtualized network function cloud 325 leverages cloud operations, applications, and architectures to support networking workloads. The virtualized network elements 330, 332 and 334 can employ network function software that provides either a one-for-one mapping of traditional network element function or alternately some combination of network functions designed for cloud computing. For example, VNEs 330, 332 and 334 can include route reflectors, domain name system (DNS) servers, and dynamic host configuration protocol (DHCP) servers, system architecture evolution (SAE) and/or mobility management entity (MME) gateways, broadband network gateways, IP edge routers for IP-VPN, Ethernet and other services, load balancers, distributers and other network elements. Because these elements do not typically need to forward large amounts of traffic, their workload can be distributed across a number of servers—each of which adds a portion of the capability, and which creates an elastic function with higher availability overall than its former monolithic version. These virtual network elements 330, 332, 334, etc. can be instantiated and managed using an orchestration approach similar to those used in cloud compute services.

The cloud computing environments 375 can interface with the virtualized network function cloud 325 via APIs that expose functional capabilities of the VNEs 330, 332, 334, etc. to provide the flexible and expanded capabilities to the virtualized network function cloud 325. In particular, network workloads may have applications distributed across the virtualized network function cloud 325 and cloud computing environment 375 and in the commercial cloud or might simply orchestrate workloads supported entirely in NFV infrastructure from these third-party locations.

Figure 4:
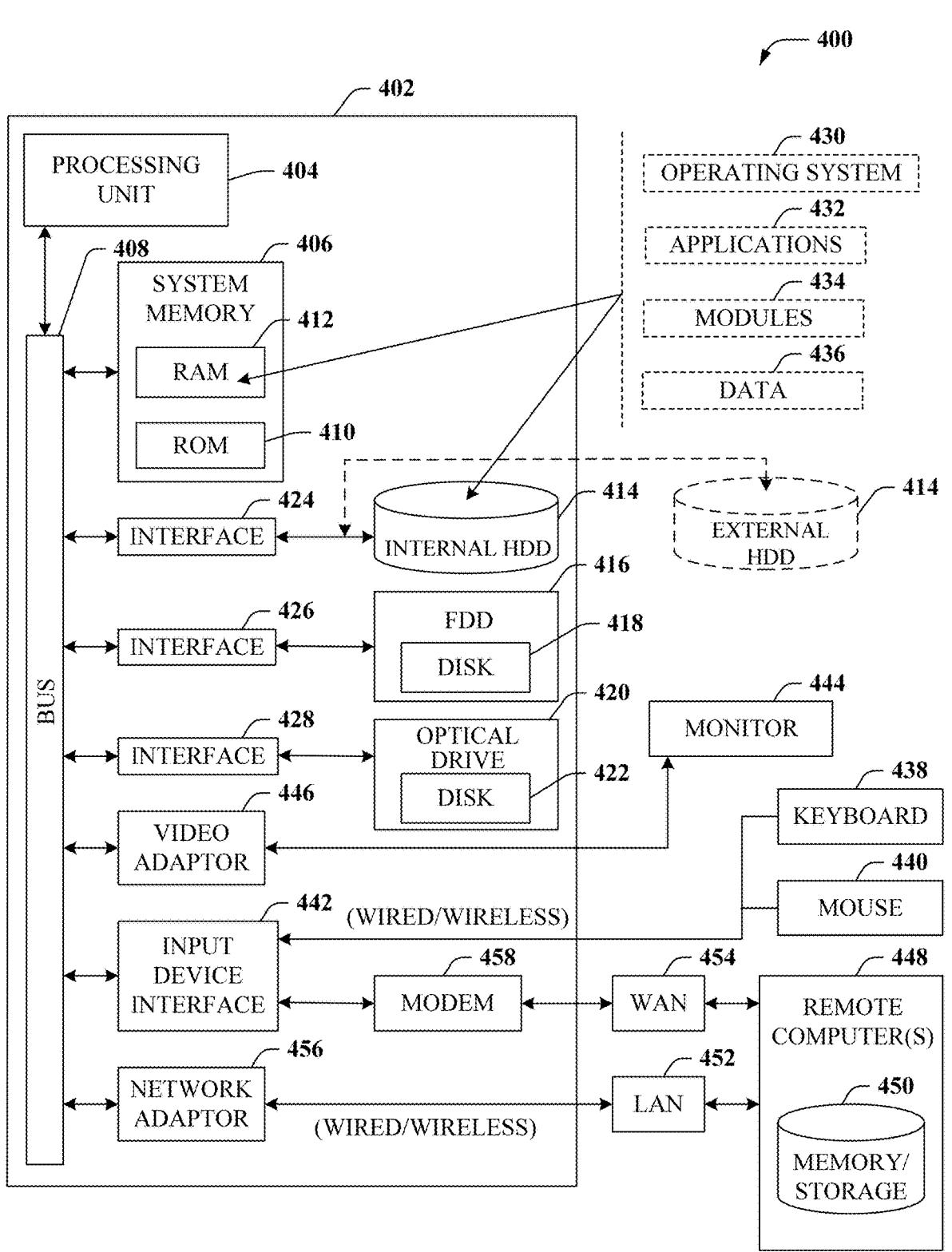
FIG. 4 is a block diagram of an example, non-limiting embodiment of a computing environment in accordance with various aspects described herein.

Turning now to FIG. 4, there is illustrated a block diagram of a computing environment in accordance with various aspects described herein. In order to provide additional context for various embodiments of the embodiments described herein, FIG. 4 and the following discussion are intended to provide a brief, general description of a suitable computing environment 400 in which the various embodiments of the subject disclosure can be implemented. In particular, computing environment 400 can be used in the implementation of network elements 150, 152, 154, 156, access terminal 112, base station or access point 122, switching device 132, media terminal 142, and/or VNEs 330, 332, 334, etc. Each of these devices can be implemented via computer-executable instructions that can run on one or more computers, and/or in combination with other program modules and/or as a combination of hardware and software. For example, computing environment 400 can facilitate in whole or in part enabling communication of user text messages, including communication of file attachments, delivery receipts and read receipts, between operators of mobile networks and operators of internet-based messaging and chat systems.

Generally, program modules comprise routines, programs, components, data structures, etc., that perform particular tasks or implement particular abstract data types. Moreover, those skilled in the art will appreciate that the methods can be practiced with other computer system configurations, comprising single-processor or multiprocessor computer systems, minicomputers, mainframe computers, as well as personal computers, hand-held computing devices, microprocessor-based or programmable consumer electronics, and the like, each of which can be operatively coupled to one or more associated devices.

As used herein, a processing circuit includes one or more processors as well as other application specific circuits such as an application specific integrated circuit, digital logic circuit, state machine, programmable gate array or other circuit that processes input signals or data and that produces output signals or data in response thereto. It should be noted that while any functions and features described herein in association with the operation of a processor could likewise be performed by a processing circuit.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically comprise a variety of media, which can comprise computer-readable storage media and/or communications media, which two terms are used herein differently from one another as follows. Computer-readable storage media can be any available storage media that can be accessed by the computer and comprises both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can comprise, but are not limited to, random access memory (RAM), read only memory (ROM), electrically erasable programmable read only memory (EEPROM), flash memory or other memory technology, compact disk read only memory (CD-ROM), digital versatile disk (DVD) or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and comprises any information delivery or transport media. The term "modulated data signal" or signals refers to a signal that has one or more of its characteristics set or changed in such a manner as to encode information in one or more signals. By way of example, and not limitation, communication media comprise wired media, such as a wired network or direct-wired connection, and wireless media such as acoustic, RF, infrared and other wireless media.

With reference again to FIG. 4, the example environment can comprise a computer 402, the computer 402 comprising a processing unit 404, a system memory 406 and a system bus 408. The system bus 408 couples system components including, but not limited to, the system memory 406 to the processing unit 404. The processing unit 404 can be any of various commercially available processors. Dual microprocessors and other multiprocessor architectures can also be employed as the processing unit 404.

The system bus 408 can be any of several types of bus structure that can further interconnect to a memory bus (with or without a memory controller), a peripheral bus, and a local bus using any of a variety of commercially available bus architectures. The system memory 406 comprises ROM 410 and RAM 412. A basic input/output system (BIOS) can be stored in a non-volatile memory such as ROM, erasable programmable read only memory (EPROM), EEPROM, which BIOS contains the basic routines that help to transfer information between elements within the computer 402, such as during startup. The RAM 412 can also comprise a high-speed RAM such as static RAM for caching data.

The computer 402 further comprises an internal hard disk drive (HDD) 414 (e.g., EIDE, SATA), which internal HDD 414 can also be configured for external use in a suitable chassis (not shown), a magnetic floppy disk drive (FDD) 416, (e.g., to read from or write to a removable diskette 418) and an optical disk drive 420, (e.g., reading a CD-ROM disk 422 or, to read from or write to other high-capacity optical media such as the DVD). The HDD 414, magnetic FDD 416 and optical disk drive 420 can be connected to the system bus 408 by a hard disk drive interface 424, a magnetic disk drive interface 426 and an optical drive interface 428, respectively. The hard disk drive interface 424 for external drive implementations comprises at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 402, the drives and storage media accommodate the storage of any data in a suitable digital format. Although the description of computer-readable storage media above refers to a hard disk drive (HDD), a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 412, comprising an operating system 430, one or more application programs 432, other program modules 434 and program data 436. All or portions of the operating system, applications, modules, and/or data can also be cached in the RAM 412. The systems and methods described herein can be implemented utilizing various commercially available operating systems or combinations of operating systems.

A user can enter commands and information into the computer 402 through one or more wired/wireless input devices, e.g., a keyboard 438 and a pointing device, such as a mouse 440. Other input devices (not shown) can comprise a microphone, an infrared (IR) remote control, a joystick, a game pad, a stylus pen, touch screen or the like. These and other input devices are often connected to the processing unit 404 through an input device interface 442 that can be coupled to the system bus 408, but can be connected by other interfaces, such as a parallel port, an IEEE 1394 serial port, a game port, a universal serial bus (USB) port, an IR interface, etc.

A monitor 444 or other type of display device can be also connected to the system bus 408 via an interface, such as a video adapter 446. It will also be appreciated that in alternative embodiments, a monitor 444 can also be any display device (e.g., another computer having a display, a smart phone, a tablet computer, etc.) for receiving display information associated with computer 402 via any communication means, including via the Internet and cloud-based networks. In addition to the monitor 444, a computer typically comprises other peripheral output devices (not shown), such as speakers, printers, etc.

The computer 402 can operate in a networked environment using logical connections via wired and/or wireless communications to one or more remote computers, such as a remote computer(s) 448. The remote computer(s) 448 can be a workstation, a server computer, a router, a personal computer, portable computer, microprocessor-based entertainment appliance, a peer device or other common network node, and typically comprises many or all of the elements described relative to the computer 402, although, for purposes of brevity, only a remote memory/storage device 450 is illustrated. The logical connections depicted comprise wired/wireless connectivity to a local area network (LAN) 452 and/or larger networks, e.g., a wide area network (WAN) 454. Such LAN and WAN networking environments are commonplace in offices and companies, and facilitate enterprise-wide computer networks, such as intranets, all of which can connect to a global communications network, e.g., the Internet.

When used in a LAN networking environment, the computer 402 can be connected to the LAN 452 through a wired and/or wireless communication network interface or adapter 456. The adapter 456 can facilitate wired or wireless communication to the LAN 452, which can also comprise a wireless AP disposed thereon for communicating with the adapter 456.

When used in a WAN networking environment, the computer 402 can comprise a modem 458 or can be connected to a communications server on the WAN 454 or has other means for establishing communications over the WAN 454, such as by way of the Internet. The modem 458, which can be internal or external and a wired or wireless device, can be connected to the system bus 408 via the input device interface 442. In a networked environment, program modules depicted relative to the computer 402 or portions thereof, can be stored in the remote memory/storage device 450. It will be appreciated that the network connections shown are example and other means of establishing a communications link between the computers can be used.

The computer 402 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can comprise Wireless Fidelity (Wi-Fi) and BLUETOOTH® wireless technologies. Thus, the communication can be a predefined structure as with a conventional network or simply an ad hoc communication between at least two devices.

Wi-Fi can allow connection to the Internet from a couch at home, a bed in a hotel room or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, n, ac, ag, etc.) to provide secure, reliable, fast wireless connectivity. A Wi-Fi network can be used to connect computers to each other, to the Internet, and to wired networks (which can use IEEE 802.3 or Ethernet). Wi-Fi networks operate in the unlicensed 2.4 and 5 GHz radio bands for example or with products that contain both bands (dual band), so the networks can provide real-world performance similar to the basic 10BaseT wired Ethernet networks used in many offices.

Figure 5:
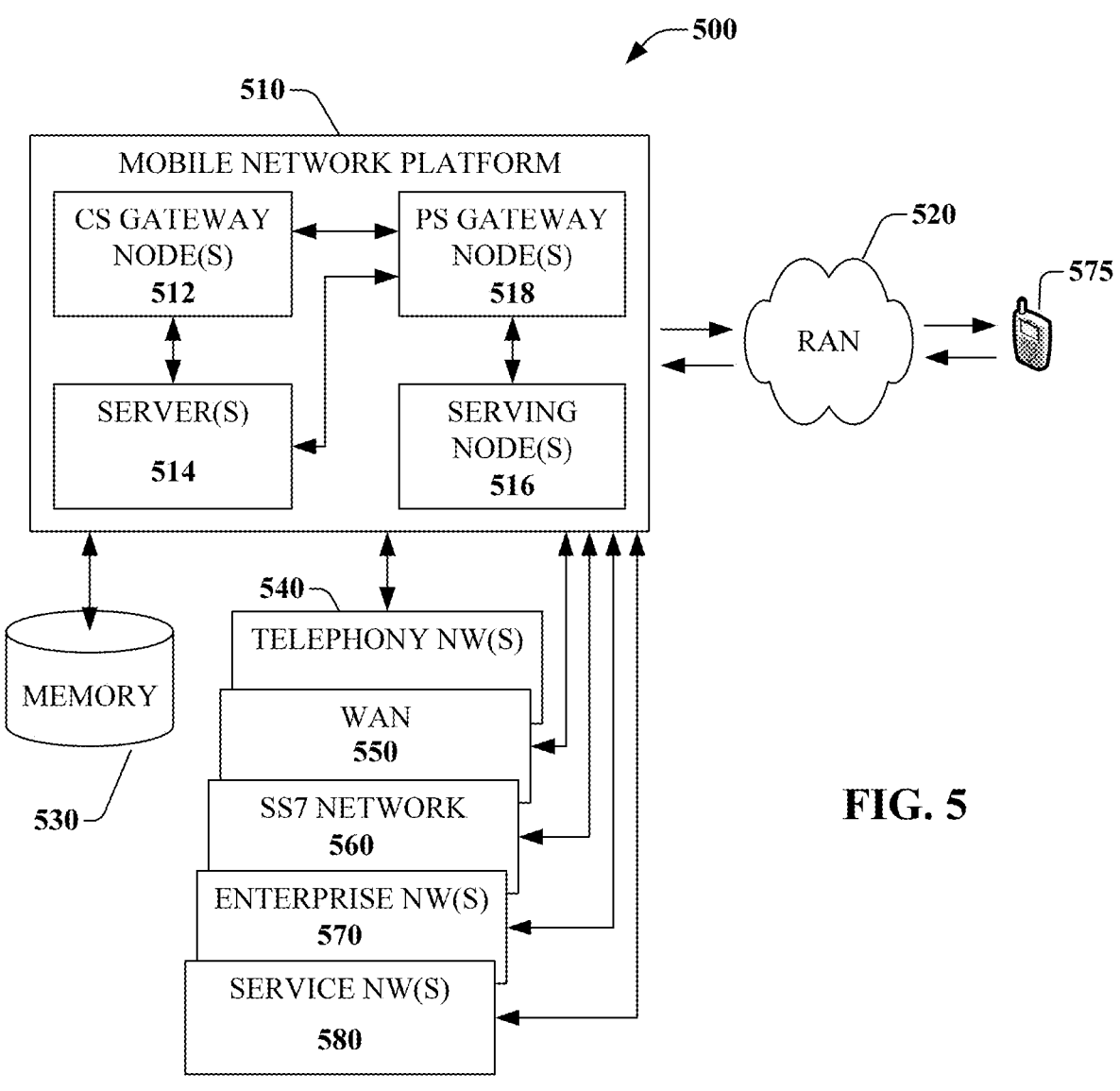
FIG. 5 is a block diagram of an example, non-limiting embodiment of a mobile network platform in accordance with various aspects described herein.

Turning now to FIG. 5, an embodiment 500 of a mobile network platform 510 is shown that is an example of network elements 150, 152, 154, 156, and/or VNEs 330, 332, 334, etc. For example, platform 510 can facilitate in whole or in part enabling communication of user text messages by users accessing the mobile network platform 510, including communication of file attachments, delivery receipts and read receipts, between operators of mobile networks and operators of internet-based messaging and chat systems. In one or more embodiments, the mobile network platform 510 can generate and receive signals transmitted and received by base stations or access points such as base station or access point 122. Generally, mobile network platform 510 can comprise components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. As a non-limiting example, mobile network platform 510 can be included in telecommunications carrier networks and can be considered carrier-side components as discussed elsewhere herein. Mobile network platform 510 comprises CS gateway node(s) 512 which can interface CS traffic received from legacy networks like telephony network(s) 540 (e.g., public switched telephone network (PSTN), or public land mobile network (PLMN)) or a signaling system #7 (SS7) network 560. CS gateway node(s) 512 can authorize and authenticate traffic (e.g., voice) arising from such networks. Additionally, CS gateway node(s) 512 can access mobility, or roaming, data generated through SS7 network 560; for instance, mobility data stored in a visited location register (VLR), which can reside in memory 530. Moreover, CS gateway node(s) 512 interfaces CS-based traffic and signaling and PS gateway node(s) 518. As an example, in a 3GPP UMTS network, CS gateway node(s) 512 can be realized at least in part in gateway GPRS support node(s) (GGSN). It should be appreciated that functionality and specific operation of CS gateway node(s) 512, PS gateway node(s) 518, and serving node(s) 516, is provided and dictated by radio technologies utilized by mobile network platform 510 for telecommunication over a radio access network 520 with other devices, such as a radiotelephone 575.

In addition to receiving and processing CS-switched traffic and signaling, PS gateway node(s) 518 can authorize and authenticate PS-based data sessions with served mobile devices. Data sessions can comprise traffic, or content(s), exchanged with networks external to the mobile network platform 510, like wide area network(s) (WANs) 550, enterprise network(s) 570, and service network(s) 580, which can be embodied in local area network(s) (LANs), can also be interfaced with mobile network platform 510 through PS gateway node(s) 518. It is to be noted that WANs 550 and enterprise network(s) 570 can embody, at least in part, a service network(s) like IP multimedia subsystem (IMS). Based on radio technology layer(s) available in technology resource(s) or radio access network 520, PS gateway node(s) 518 can generate packet data protocol contexts when a data session is established; other data structures that facilitate routing of packetized data also can be generated. To that end, in an aspect, PS gateway node(s) 518 can comprise a tunnel interface (e.g., tunnel termination gateway (TTG) in 3GPP UMTS network(s) (not shown)) which can facilitate packetized communication with disparate wireless network(s), such as Wi-Fi networks.

In embodiment 500, mobile network platform 510 also comprises serving node(s) 516 that, based upon available radio technology layer(s) within technology resource(s) in the radio access network 520, convey the various packetized flows of data streams received through PS gateway node(s) 518. It is to be noted that for technology resource(s) that rely primarily on CS communication, server node(s) can deliver traffic without reliance on PS gateway node(s) 518; for example, server node(s) can embody at least in part a mobile switching center. As an example, in a 3GPP UMTS network, serving node(s) 516 can be embodied in serving GPRS support node(s) (SGSN).

For radio technologies that exploit packetized communication, server(s) 514 in mobile network platform 510 can execute numerous applications that can generate multiple disparate packetized data streams or flows, and manage (e.g., schedule, queue, format . . . ) such flows. Such application(s) can comprise add-on features to standard services (for example, provisioning, billing, customer support . . . ) provided by mobile network platform 510. Data streams (e.g., content(s) that are part of a voice call or data session) can be conveyed to PS gateway node(s) 518 for authorization/authentication and initiation of a data session, and to serving node(s) 516 for communication thereafter. In addition to application server, server(s) 514 can comprise utility server(s), a utility server can comprise a provisioning server, an operations and maintenance server, a security server that can implement at least in part a certificate authority and firewalls as well as other security mechanisms, and the like. In an aspect, security server(s) secure communication served through mobile network platform 510 to ensure network's operation and data integrity in addition to authorization and authentication procedures that CS gateway node(s) 512 and PS gateway node(s) 518 can enact. Moreover, provisioning server(s) can provision services from external network(s) like networks operated by a disparate service provider; for instance, WAN 550 or Global Positioning System (GPS) network(s) (not shown). Provisioning server(s) can also provision coverage through networks associated to mobile network platform 510 (e.g., deployed and operated by the same service provider), such as the distributed antennas networks shown in FIG. 1(s) that enhance wireless service coverage by providing more network coverage.

It is to be noted that server(s) 514 can comprise one or more processors configured to confer at least in part the functionality of mobile network platform 510. To that end, the one or more processors can execute code instructions stored in memory 530, for example. It should be appreciated that server(s) 514 can comprise a content manager, which operates in substantially the same manner as described hereinbefore.

In example embodiment 500, memory 530 can store information related to operation of mobile network platform 510. Other operational information can comprise provisioning information of mobile devices served through mobile network platform 510, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 530 can also store information from at least one of telephony network(s) 540, WAN 550, SS7 network 560, or enterprise network(s) 570. In an aspect, memory 530 can be, for example, accessed as part of a data store component or as a remotely connected memory store.

In order to provide a context for the various aspects of the disclosed subject matter, FIG. 5, and the following discussion, are intended to provide a brief, general description of a suitable environment in which the various aspects of the disclosed subject matter can be implemented. While the subject matter has been described above in the general context of computer-executable instructions of a computer program that runs on a computer and/or computers, those skilled in the art will recognize that the disclosed subject matter also can be implemented in combination with other program modules. Generally, program modules comprise routines, programs, components, data structures, etc. that perform particular tasks and/or implement particular abstract data types.

Figure 6:
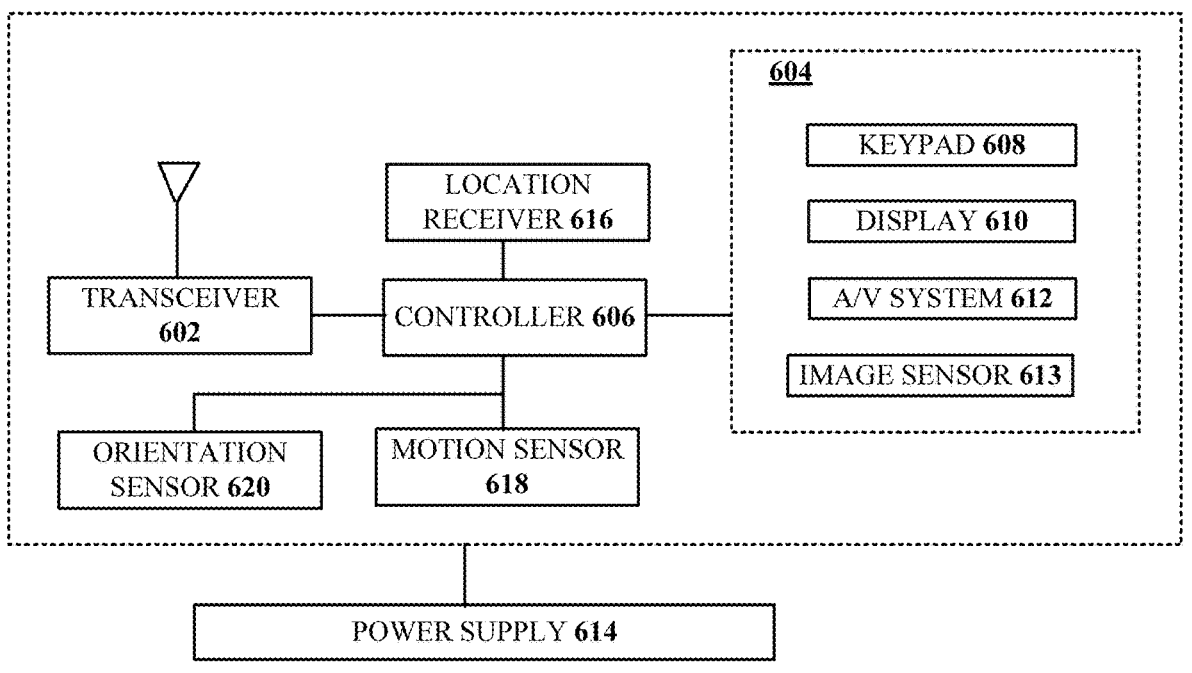
FIG. 6 is a block diagram of an example, non-limiting embodiment of a communication device in accordance with various aspects described herein.

Turning now to FIG. 6, an illustrative embodiment of a communication device 600 is shown. The communication device 600 can serve as an illustrative embodiment of devices such as data terminals 114, mobile devices 124, vehicle 126, display devices 144 or other client devices for communication via either communications network 125. For example, communication device 600 can facilitate in whole or in part enabling communication of user text messages between users of communication devices such as communication device 600 and users of internet-based messaging services, including communication of file attachments, delivery receipts and read receipts, between operators of mobile networks and operators of internet-based messaging and chat systems.

The communication device 600 can comprise a wireline and/or wireless transceiver 602 (herein transceiver 602), a user interface (UI) 604, a power supply 614, a location receiver 616, a motion sensor 618, an orientation sensor 620, and a controller 606 for managing operations thereof. The transceiver 602 can support short-range or long-range wireless access technologies such as Bluetooth®, ZigBee®, Wi-Fi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1X, UMTS/HSDPA, GSM/GPRS, TDMA/EDGE, EV/DO, WiMAX, SDR, LTE, as well as other next generation wireless communication technologies as they arise. The transceiver 602 can also be adapted to support circuit-switched wireline access technologies (such as PSTN), packet-switched wireline access technologies (such as TCP/IP, VOIP, etc.), and combinations thereof.

The UI 604 can include a depressible or touch-sensitive keypad 608 with a navigation mechanism such as a roller ball, a joystick, a mouse, or a navigation disk for manipulating operations of the communication device 600. The keypad 608 can be an integral part of a housing assembly of the communication device 600 or an independent device operably coupled thereto by a tethered wireline interface (such as a USB cable) or a wireless interface supporting for example Bluetooth®. The keypad 608 can represent a numeric keypad commonly used by phones, and/or a QWERTY keypad with alphanumeric keys. The UI 604 can further include a display 610 such as monochrome or color LCD (Liquid Crystal Display), OLED (Organic Light Emitting Diode) or other suitable display technology for conveying images to an end user of the communication device 600. In an embodiment where the display 610 is touch-sensitive, a portion or all of the keypad 608 can be presented by way of the display 610 with navigation features.

The display 610 can use touch screen technology to also serve as a user interface for detecting user input. As a touch screen display, the communication device 600 can be adapted to present a user interface having graphical user interface (GUI) elements that can be selected by a user with a touch of a finger. The display 610 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 610 can be an integral part of the housing assembly of the communication device 600 or an independent device communicatively coupled thereto by a tethered wireline interface (such as a cable) or a wireless interface.

The UI 604 can also include an audio system 612 that utilizes audio technology for conveying low volume audio (such as audio heard in proximity of a human car) and high-volume audio (such as speakerphone for hands free operation). The audio system 612 can further include a microphone for receiving audible signals of an end user. The audio system 612 can also be used for voice recognition applications. The UI 604 can further include an image sensor 613 such as a charged coupled device (CCD) camera for capturing still or moving images.

The power supply 614 can utilize common power management technologies such as replaceable and rechargeable batteries, supply regulation technologies, and/or charging system technologies for supplying energy to the components of the communication device 600 to facilitate long-range or short-range portable communications. Alternatively, or in combination, the charging system can utilize external power sources such as DC power supplied over a physical interface such as a USB port or other suitable tethering technologies.

The location receiver 616 can utilize location technology such as a global positioning system (GPS) receiver capable of assisted GPS for identifying a location of the communication device 600 based on signals generated by a constellation of GPS satellites, which can be used for facilitating location services such as navigation. The motion sensor 618 can utilize motion sensing technology such as an accelerometer, a gyroscope, or other suitable motion sensing technology to detect motion of the communication device 600 in three-dimensional space. The orientation sensor 620 can utilize orientation sensing technology such as a magnetometer to detect the orientation of the communication device 600 (north, south, west, and cast, as well as combined orientations in degrees, minutes, or other suitable orientation metrics).

The communication device 600 can use the transceiver 602 to also determine a proximity to a cellular, Wi-Fi, Bluetooth®, or other wireless access points by sensing techniques such as utilizing a received signal strength indicator (RSSI) and/or signal time of arrival (TOA) or time of flight (TOF) measurements. The controller 606 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 600.

Other components not shown in FIG. 6 can be used in one or more embodiments of the subject disclosure. For instance, the communication device 600 can include a slot for adding or removing an identity module such as a Subscriber Identity Module (SIM) card or Universal Integrated Circuit Card (UICC). SIM or UICC cards can be used for identifying subscriber services, executing programs, storing subscriber data, and so on.

The terms "first," "second," "third," and so forth, as used in the claims, unless otherwise clear by context, is for clarity only and does not otherwise indicate or imply any order in time. For instance, "a first determination," "a second determination," and "a third determination," does not indicate or imply that the first determination is to be made before the second determination, or vice versa, etc.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can comprise both volatile and nonvolatile memory, by way of illustration, and not limitation, volatile memory, non-volatile memory, disk storage, and memory storage. Further, nonvolatile memory can be included in read only memory (ROM), programmable ROM (PROM), electrically programmable ROM (EPROM), electrically erasable ROM (EEPROM), or flash memory. Volatile memory can comprise random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Moreover, it will be noted that the disclosed subject matter can be practiced with other computer system configurations, comprising single-processor or multiprocessor computer systems, mini-computing devices, mainframe computers, as well as personal computers, hand-held computing devices (e.g., PDA, phone, smartphone, watch, tablet computers, netbook computers, etc.), microprocessor-based or programmable consumer or industrial electronics, and the like. The illustrated aspects can also be practiced in distributed computing environments where tasks are performed by remote processing devices that are linked through a communications network; however, some if not all aspects of the subject disclosure can be practiced on stand-alone computers. In a distributed computing environment, program modules can be located in both local and remote memory storage devices.

In one or more embodiments, information regarding use of services can be generated including services being accessed, media consumption history, user preferences, and so forth. This information can be obtained by various methods including user input, detecting types of communications (e.g., video content vs. audio content), analysis of content streams, sampling, and so forth. The generating, obtaining and/or monitoring of this information can be responsive to an authorization provided by the user. In one or more embodiments, an analysis of data can be subject to authorization from user(s) associated with the data, such as an opt-in, an opt-out, acknowledgement requirements, notifications, selective authorization based on types of data, and so forth.

Some of the embodiments described herein can also employ artificial intelligence (AI) to facilitate automating one or more features described herein. The embodiments (e.g., in connection with automatically identifying acquired cell sites that provide a maximum value/benefit after addition to an existing communication network) can employ various AI-based schemes for carrying out various embodiments thereof. Moreover, the classifier can be employed to determine a ranking or priority of each cell site of the acquired network. A classifier is a function that maps an input attribute vector, $x=(x_1, x_2, x_3, x_4 \ldots x_n)$, to a confidence that the input belongs to a class, that is, $f(x)=$confidence (class). Such classification can employ a probabilistic and/or statistical-based analysis (e.g., factoring into the analysis utilities and costs) to determine or infer an action that a user desires to be automatically performed. A support vector machine (SVM) is an example of a classifier that can be employed. The SVM operates by finding a hypersurface in the space of possible inputs, which the hypersurface attempts to split the triggering criteria from the non-triggering events. Intuitively, this makes the classification correct for testing data that is near, but not identical to training data. Other directed and undirected model classification approaches comprise, e.g., naïve Bayes, Bayesian networks, decision trees, neural networks, fuzzy logic models, and probabilistic classification models providing different patterns of independence can be employed. Classification as used herein also is inclusive of statistical regression that is utilized to develop models of priority.

As will be readily appreciated, one or more of the embodiments can employ classifiers that are explicitly trained (e.g., via a generic training data) as well as implicitly trained (e.g., via observing UE behavior, operator preferences, historical information, receiving extrinsic information). For example, SVMs can be configured via a learning or training phase within a classifier constructor and feature selection module. Thus, the classifier(s) can be used to automatically learn and perform a number of functions, including but not limited to determining according to predetermined criteria which of the acquired cell sites will benefit a maximum number of subscribers and/or which of the acquired cell sites will add minimum value to the existing communication network coverage, etc.

As used in some contexts in this application, in some embodiments, the terms "component," "system" and the like are intended to refer to, or comprise, a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, computer-executable instructions, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can comprise a processor therein to execute software or firmware that confers at least in part the functionality of the electronic components. While various components have been illustrated as separate components, it will be appreciated that multiple components can be implemented as a single component, or a single component can be implemented as multiple components, without departing from example embodiments.

Further, the various embodiments can be implemented as a method, apparatus or article of manufacture using standard programming and/or engineering techniques to produce software, firmware, hardware or any combination thereof to control a computer to implement the disclosed subject matter. The term "article of manufacture" as used herein is intended to encompass a computer program accessible from any computer-readable device or computer-readable storage/communications media. For example, computer readable storage media can include, but are not limited to, magnetic storage devices (e.g., hard disk, floppy disk, magnetic strips), optical disks (e.g., compact disk (CD), digital versatile disk (DVD)), smart cards, and flash memory devices (e.g., card, stick, key drive). Of course, those skilled in the art will recognize many modifications can be made to this configuration without departing from the scope or spirit of the various embodiments.

In addition, the words "example" and "exemplary" are used herein to mean serving as an instance or illustration. Any embodiment or design described herein as "example" or "exemplary" is not necessarily to be construed as preferred or advantageous over other embodiments or designs. Rather, use of the word example or exemplary is intended to present concepts in a concrete fashion. As used in this application, the term "or" is intended to mean an inclusive "or" rather than an exclusive "or". That is, unless specified otherwise or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, terms such as "user equipment," "mobile station," "mobile," subscriber station," "access terminal," "terminal," "handset," "mobile device" (and/or terms representing similar terminology) can refer to a wireless device utilized by a subscriber or user of a wireless communication service to receive or convey data, control, voice, video, sound, gaming or substantially any data-stream or signaling-stream. The foregoing terms are utilized interchangeably herein and with reference to the related drawings.

Furthermore, the terms "user," "subscriber," "customer," "consumer" and the like are employed interchangeably throughout, unless context warrants particular distinctions among the terms. It should be appreciated that such terms can refer to human entities or automated components supported through artificial intelligence (e.g., a capacity to make inference based, at least, on complex mathematical formalisms), which can provide simulated vision, sound recognition and so forth.

As employed herein, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components or any combination thereof designed to perform the functions described herein. Processors can exploit nano-scale architectures such as, but not limited to, molecular and quantum-dot based transistors, switches and gates, in order to optimize space usage or enhance performance of user equipment. A processor can also be implemented as a combination of computing processing units.

As used herein, terms such as "data storage," data storage," "database," and substantially any other information storage component relevant to operation and functionality of a component, refer to "memory components," or entities embodied in a "memory" or components comprising the memory. It will be appreciated that the memory components or computer-readable storage media, described herein can be either volatile memory or nonvolatile memory or can include both volatile and nonvolatile memory.

What has been described above includes mere examples of various embodiments. It is, of course, not possible to describe every conceivable combination of components or methodologies for purposes of describing these examples, but one of ordinary skill in the art can recognize that many further combinations and permutations of the present embodiments are possible. Accordingly, the embodiments disclosed and/or claimed herein are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

As may also be used herein, the term(s) "operably coupled to", "coupled to", and/or "coupling" includes direct coupling between items and/or indirect coupling between items via one or more intervening items. Such items and intervening items include, but are not limited to, junctions, communication paths, components, circuit elements, circuits, functional blocks, and/or devices. As an example of indirect coupling, a signal conveyed from a first item to a second item may be modified by one or more intervening items by modifying the form, nature or format of information in a signal, while one or more elements of the information in the signal are nevertheless conveyed in a manner than can be recognized by the second item. In a further example of indirect coupling, an action in a first item can cause a reaction on the second item, as a result of actions and/or reactions in one or more intervening items.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

What is claimed is:

1. A method, comprising:

identifying, by a processing system including a processor at an originating network operated by a first network operator, a recipient of a message at a terminating network operated by a second network operator;

communicating, by the processing system, a query message from the originating network to a domain name service, the query message including a query message service identifier, wherein the query message service identifier is associated with an inter-partner messaging service, the inter-partner messaging service based on an agreement between the first network operator and the second network operator;

receiving, by the processing system, at the originating network, a response message, the response message including a response message service identifier, wherein the response message service identifier is associated with the inter-partner messaging service, the response message including addressing information for communicating the message to the terminating network;

formatting, by the processing system, the message;

transmitting, by the processing system, the message from the originating network to the terminating network based on the addressing information;

receiving, by the processing system, a file at the originating network, the file being associated with a user of a user device;

communicating, by the processing system, a text message from the originating network to the terminating network, the text message including information about the file; and communicating, by the processing system, the file to the terminating network responsive to a query from the terminating network.

2. The method of claim 1, wherein the identifying the recipient of the message at the terminating network comprises:

confirming, by the processing system, that the recipient is served by the terminating network.

3. The method of claim 2, wherein the identifying the recipient of the message at the terminating network comprises:

communicating, by the processing system, a query to the terminating network, the query requesting a uniform resource identifier for the recipient; and receiving, by the processing system, from the terminating network, a username of the recipient on the terminating network or a telephone number of the recipient, or both of these.

4. The method of claim 3, wherein the formatting the message comprises:

associating the username of the recipient or the telephone number of the recipient with the message for delivery to the recipient at the terminating network.

5. The method of claim 1, wherein the communicating the query message from the originating network to the domain name service comprises:

communicating, by the processing system, a session initiation protocol query message including a service (SRV) record to the terminating network, the SRV record including a query prefix, wherein the query prefix identifies the inter-partner messaging service.

6. The method of claim 5, wherein the receiving the response message comprises:

receiving, by the processing system, a session initiation protocol response message including a service (SRV) record including a response prefix, wherein the response prefix identifies the inter-partner messaging service.

7. The method of claim 6, wherein the receiving the session initiation protocol response message comprises:

receiving, by the processing system, the session initiation protocol response message having a response prefix matching the query prefix, wherein the query prefix and the response prefix are associated with the inter-partner messaging service.

8. The method of claim 1, wherein the communicating the text message from the originating network to the terminating network comprises:

communicating, by the processing system, a text message including a uniform resource locator (URL) identifying a location at the originating network where the file is located after the receiving the file from the user of the user device.

9. The method of claim 8, comprising:

receiving, by the processing system, a hypertext transfer protocol (HTTP) query message from the terminating network requesting the file, the HTTP query message including a query prefix, wherein the query prefix identifies the inter-partner messaging service; and communicating, by the processing system, a HTTP response message from the originating network to the terminating network, the HTTP response message including the file, the HTTP response message including a response prefix, wherein the response prefix identifies the inter-partner messaging service.

10. The method of claim 1, wherein the identifying the recipient of the message at the terminating network further comprises determining a service type for the message, wherein the service type is used for service-deterministic routing to the terminating network.

11. The method of claim 1, wherein the communicating of the file from the originating network to the terminating network includes using a hypertext transfer protocol (HTTP) message having a protocol prefix to establish a socket for file transfer from the originating network to the terminating network.

12. A device, comprising:

a processing system including a processor; and a memory that stores executable instructions that, when executed by the processing system, facilitate performance of operations, the operations comprising:

receiving a text message from a user at a user device on an originating network operated by a first network operator, the message including recipient identification information for a recipient on a terminating network operated by a second network operator;

communicating a service initiation protocol (SIP) query message to a domain name service, the SIP query message including a service identifier for an inter-partner messaging service, wherein the inter-partner messaging service is based on an operating agreement between the first network operator and the second network operator;

receiving a SIP response message from the domain name service, the SIP response message including information about a socket and an internet protocol (IP) address of the terminating network to use for the inter-partner messaging service;

transmitting the text message from the originating network to the terminating network at the socket and the IP address of the terminating network received in the SIP response message;

receiving a file from the user of a user device at the originating network, the file for transfer to the recipient at the terminating network;

communicating, by the processing system, a hypertext transfer protocol (HTTP) message including a uniform resource locator (URL) identifying a location at the originating network where the file is located after the receiving the file from the user of the user device, the HTTP message including a prefix, wherein the prefix identifies the inter-partner messaging service;

receiving, by the processing system, a HTTP query message from the terminating network requesting the file, the HTTP query message including a query prefix, wherein the query prefix identifies the inter-partner messaging service; and communicating, by the processing system, a HTTP response message from the originating network to the terminating network, the HTTP response message including the file, the HTTP response message further including a response prefix, wherein the response prefix identifies the inter-partner messaging service.

13. The device of claim 12, wherein the operations further comprise:

formatting a query message requesting a Uniform Resource Indicator for the recipient on the terminating network;

communicating the query message to the domain name service, the query message including a query prefix, wherein the query prefix identifies the inter-partner messaging service; and receiving a response message from the domain name service, the response message including a response prefix, wherein the query prefix identifies the inter-partner messaging service.

14. The device of claim 13, wherein the operations further comprise:

determining, from the response message from the domain name service, that the recipient is served by a messaging service on the terminating network.

15. The device of claim 13, wherein the receiving a response message from the domain name service comprises:

receiving from the domain name service, a username of the recipient on the terminating network or a telephone number of the recipient, or both of these.

16. The device of claim 15, wherein the transmitting the text message from the originating network to the terminating network comprises:

formatting a SIP message including one of the username of the recipient or the telephone number of the recipient; and transmitting in the text message a service identifier for the inter-partner messaging service.

17. The device of claim 12, wherein the receiving of the file from the user of the user device includes storing the file in a file transfer content server (FTCS) of the originating network and generating a uniform resource locator (URL) to identify a location of the stored file.

18. A non-transitory machine-readable medium, comprising executable instructions that, when executed by a processing system including a processor, facilitate performance of operations, the operations comprising:

receiving a text message from a user at a user device on an originating network, the text message including content intended for a recipient at a recipient device on a terminating network;

confirming the recipient is served by a messaging service of the terminating network, including transmitting a confirming message, the confirming message including a message service identifier identifying an inter-partner messaging service by the originating network and the terminating network;

obtaining, for the recipient, a Uniform Resource Identifier (URI) which identifies an account of the recipient on the terminating network, including transmitting a query message from the originating network to the terminating network, the query message including the message service identifier identifying the inter-partner messaging service by the originating network and the terminating network;

formatting a message including the content intended for the recipient at the recipient device on a terminating network, the message further including addressing information based on the URI which identifies the account of the recipient on the terminating network, the message further including the message service identifier identifying the inter-partner messaging service by the originating network and the terminating network;

transmitting the message from the originating network to the terminating network;

identifying a file attachment to be transmitted with the content intended for the recipient at the recipient device on a terminating network; and providing the file attachment from the originating network to the terminating network, including communicating a hypertext transfer protocol (HTTP) message from the originating network to the terminating network, the HTTP message including the file attachment, the HTTP message including the message service identifier for inter-partner messaging by the originating network and the terminating network;

communicating a text message from the originating network to the terminating network, the text message including information about the file attachment, the text message having a HTTP service type, the text message including the message service identifier for inter-partner messaging by the originating network and the terminating network; and receiving a HTTP query message from the terminating network requesting the file attachment, the HTTP query message including the message service identifier for inter-partner messaging by the originating network and the terminating network.

19. The non-transitory machine-readable medium of claim 18, wherein the operations further comprise:

formatting the message including the message service identifier for inter-partner messaging by the originating network and the terminating network set to a value of _ipm and with a service type set to E2U+ipm.

20. The non-transitory machine-readable medium of claim 18, wherein the HTTP query message from the terminating network requesting the file attachment includes a query prefix identifying the inter-partner messaging service and specifies a location of the file at the originating network.

\* \* \* \* \*